United States Patent
Berthilsson

(10) Patent No.: US 10,253,753 B2
(45) Date of Patent: Apr. 9, 2019

(54) ROTOR BLADE FOR WIND TURBINE

(71) Applicant: Winfoor AB, Lund (SE)

(72) Inventor: Rikard Berthilsson, Furulund (SE)

(73) Assignee: WINFOOR AB (SE)

( * ) Notice: Subject to any disclaimer, the term of this patent is extended or adjusted under 35 U.S.C. 154(b) by 0 days.

(21) Appl. No.: 15/513,147

(22) PCT Filed: Sep. 23, 2015

(86) PCT No.: PCT/SE2015/050992
§ 371 (c)(1),
(2) Date: Mar. 21, 2017

(87) PCT Pub. No.: WO2016/048221
PCT Pub. Date: Mar. 31, 2016

(65) Prior Publication Data
US 2017/0306923 A1    Oct. 26, 2017

(30) Foreign Application Priority Data
Sep. 25, 2014   (SE) .................................... 1451129

(51) Int. Cl.
*F03D 1/06*   (2006.01)
*F03D 3/06*   (2006.01)

(52) U.S. Cl.
CPC .............. *F03D 1/0675* (2013.01); *F03D 1/06* (2013.01); *F03D 3/062* (2013.01); *F05B 2240/221* (2013.01); *F05B 2240/30* (2013.01); *F05B 2240/302* (2013.01); *F05B 2250/20* (2013.01); *Y02E 10/721* (2013.01); *Y02E 10/74* (2013.01)

(58) Field of Classification Search
CPC . F03D 1/00; F03D 1/06; F03D 1/0608; F03D 1/0633; F03D 1/0641; F03D 1/065; F03D 1/0675; F03D 3/00; F03D 3/002; F03D 3/005; F03D 3/06; F03D 3/061; F03D 3/062
USPC ................. 416/227 R, 227 A, 231 B, 231 R
See application file for complete search history.

(56) References Cited

U.S. PATENT DOCUMENTS

| | | | |
|---|---|---|---|
| 1,820,529 A | 8/1931 | Darrieus | |
| 4,081,221 A * | 3/1978 | Andrews | ............... F03D 1/0608 |
| | | | 416/193 R |
| 4,329,116 A * | 5/1982 | Ljungstrom | ............ F03D 3/061 |
| | | | 416/132 B |
| 5,161,952 A | 11/1992 | Eggers, Jr. | |
| 7,517,198 B2 | 4/2009 | Baker | |
| 8,870,540 B2 * | 10/2014 | Houlsby | ................ F03B 3/121 |
| | | | 416/187 |
| 9,822,760 B2 * | 11/2017 | Tahar | ................... F03D 1/0633 |

(Continued)

FOREIGN PATENT DOCUMENTS

| | | |
|---|---|---|
| CA | 2425447 A1 | 10/2004 |
| CN | 102661239 A | 9/2012 |

(Continued)

*Primary Examiner* — Richard A Edgar
(74) *Attorney, Agent, or Firm* — Condo Roccia Koptiw LLP

(57) ABSTRACT

A blade (104) for a rotor of a wind turbine is provided. The blade (104) comprises: a truss-like three-dimensional structure having strut members (108; 110; 112) forming the truss-like structure, wherein a plurality of the strut members (108; 110; 112) in the truss-like structure have an airfoil-shaped cross-section.

7 Claims, 5 Drawing Sheets

(56) References Cited

U.S. PATENT DOCUMENTS

| | | | |
|---|---|---|---|
| 2008/0317599 A1* | 12/2008 | Martinez | F03D 1/0633 |
| | | | 416/182 |
| 2009/0232656 A1 | 9/2009 | Grabau | |
| 2015/0354530 A1* | 12/2015 | Harrison | F03D 1/0633 |
| | | | 416/198 A |

FOREIGN PATENT DOCUMENTS

| | | |
|---|---|---|
| DE | 4010211 A1 | 10/1991 |
| EP | 0064742 A2 | 11/1982 |
| EP | 1 887 219 A1 | 2/2008 |
| EP | 2006537 A2 | 12/2008 |
| WO | WO 98/31934 A1 | 7/1998 |
| WO | WO 2007045244 A1 | 4/2007 |
| WO | WO 2009/121927 A1 | 10/2009 |
| WO | WO 2011053177 A1 | 5/2011 |
| WO | WO 2011/106733 A2 | 9/2011 |
| WO | WO 2013/170497 A1 | 11/2013 |
| WO | WO 2014/056507 A1 | 4/2014 |
| WO | WO 2014056507 A1 * | 4/2014 ........... F03D 1/0633 |

* cited by examiner

ROTOR BLADE FOR WIND TURBINE

CROSS-REFERENCE TO RELATED APPLICATIONS

This application is the National Stage Entry under 35 U.S.C. § 371 of Patent Cooperation Treaty Application No. PCT/SE2015/050992, filed 23 Sep. 2015, which claims the benefit of Sweden Application No. 1451129-9, filed 25 Sep. 2014, the disclosures of which are incorporated herein by references in their entirety.

TECHNICAL FIELD

The present invention relates to a rotor blade, which may be used in a wind turbine.

BACKGROUND OF THE INVENTION

There is a growing interest in renewable energy technologies throughout the world. For instance, climate change concerns are driving energy production to renewable energy technologies. Wind power is therefore an important energy source and the amount of power produced annually through wind power is growing rapidly.

Wind power is the conversion of wind energy into more useful forms, such as electricity. In this regard, use is made of a wind turbine, which is a device that converts kinetic energy from the wind into electrical power. A wind turbine comprises a rotor having a central hub, to which one or more blades are attached. The rotor is arranged to rotate as the blades are subject to a mass of air passing the wind turbine due to a blowing wind. The rotation of the rotor thus generates mechanical energy that may be converted to electrical power in the wind turbine.

There are two main types of wind turbines, horizontal-axis wind turbines (HAWT), wherein the blades rotate about a horizontal axis, and vertical-axis wind turbines (VAWT), wherein the blades rotate about a vertical axis. The far most common type of wind turbine for large-scale power production is the HAWT and the discussion below is mainly directed to HAWTs.

The blades are formed with an airfoil-shaped cross-section. This implies that the blades are formed such that the surface at the leading side in the rotational direction of the blade causes the air passing the surface to take a longer path than the air passing the surface at the trailing side. Hence, the air passing over the surface at the leading side will travel faster than the air passing over the surface at the trailing side. Therefore, a difference in pressure is formed, resulting in a force on the blade. This force induces a torque about a rotor axis which causes the rotor to rotate.

The relative flow velocity, including speed and direction, between a moving blade and the air is called the apparent flow velocity. As air passes the surface of an airfoil shaped blade it exerts a force on it that depends on the apparent flow velocity and the shape of the airfoil. Lift force is the component of the force that is perpendicular to the oncoming apparent flow direction. It contrasts with the drag force, which is the component of the force parallel to the apparent flow direction. Contrary to the lift force, the drag force tends to counteract the movement of the blade and it can be shown through mathematical analysis that in order to optimize the power efficiency of the turbine the blade should be designed so as to maximize the ratio between the lift force and the drag force.

The power production capacity of a wind turbine is mainly affected by the length of the blades. The power generated by a wind turbine is proportional to the area swept by the blades, which is proportional to the square of the length of the blades. Hence, an increased length of the blades enables an increased power production of the wind turbine.

However, the blades also need to be designed with the loads encountered by the blades during operation of the wind turbine in mind. Aerodynamic loads are formed by means of the apparent flow velocity of the air. The aerodynamic loads cause a bending moment on the blade, which is largest closest to the hub. While the aerodynamic loads may vary due to wind speed, the aerodynamic loads exerted on the blades are also proportional to the square of the length of the blades.

The blades are also exerted to gravity loads due to the mass of the blade, and as the blade rotates a full circle the blade will go through a fatigue cycle. The gravity loads are proportional to the cube of the length of the blade. Therefore, although the aerodynamic loads are dominating for small-size blades, the gravity loads will become dominating as the length of the blades increases.

Thus, as the length of the blades is increased in order to increase the power production capacity of wind turbines, the blades need to be designed with a close attention to the gravity loads exerted on the blades. Otherwise, there is a risk of fatigue failure due to the large mass of the blade. Furthermore, long blade will lead to problems concerning deformations, cracks and torsion of the blades. Hence, design of the blade becomes difficult as the length of the blade increases.

The mass of the blade and the associated gravity loads, as well as the aerodynamic loads, may force the design of the shape of the blade to be a compromise between strength and aerodynamics. In particular close to the hub, the blade may need to have a design which is optimized for providing strength rather than airfoil characteristics, which implies that the aerodynamic properties of the blade will not be optimal.

Further, when the wind turbine is to be installed, the wind turbine parts need to be transported to the site of the wind turbine. The wind turbine consists of very large parts, such as the long blades, which makes transportation of the parts to the site a difficult task. For instance, the wind turbine parts may be much longer than the usually allowed length of vehicles, which implies that special vehicles need to be used for transportation of the parts on land. Further, the mass of the wind turbine parts may also set special requirements in order to allow transportation of the parts to the site. Altogether, problems associated with transportation of long blades will limit the economically feasible size, at least for land based wind turbines. Also, installation of the parts on the site is cumbersome due to the mass and length of the parts.

Also, the cost of the blade of course increases with the mass of the blade. Since the mass of the blade is proportional to the cube of the length of the blade, the costs of manufacturing a blade increases more rapidly with the length of the blade than the power production capacity of the wind turbine.

Finally, a large mass of the blade may cause problems with tower and foundation of the wind turbine, as large loads are exerted on these parts of the wind turbine by the mass of the blade. Also, the increased mass of the blade causes increased loads on the rotor hub by means of the increased rotational inertia.

It is clear from the above that any modification of blades of wind turbines, such that the mass of the blades is decreased would significantly improve problems faced in design of the blades.

In U.S. Pat. No. 7,517,198, a lightweight wind turbine blade is disclosed. The turbine blade comprises a lightweight composite support truss structure. The support truss structure is covered by an assembly of skins forming the basic airfoil shape of the blade. A series of laterally spaced ribs form a spine of the blade and define the general airfoil shape. However, the blade needs to be thin in order to keep the aerodynamic loads down. This implies that it is difficult to obtain a strong structure. Therefore, the ribs closest to the hub have a circular shape providing strength to the structure rather than good aerodynamic properties.

In EP 1 887 219, a special blade structure is disclosed. The blade structure makes use of the fact that the moment of inertia of a blade can be increased by designing a profile section of the blade so as to increase the surface of the section and the distance of the section to a neutral line. Further, the stress that a material of a section in the structure supports is inversely dependent to the moment of inertia, whereby increasing the moment of inertia decreases the stress of the material. Hence, by means of dividing the blade into sub-blades and separating the sub-blades, the moment of inertia may be increased without increasing the weight of the material. However, to achieve the greater moment of inertia, the sub-blades need to be firmly joined. Therefore, links are spaced out along the length of the sub-blades. Although this structure allows the stress that a material of a section in the structure supports to be decreased, the weight of the blade is in principle not decreased. Hence, there may still be a need to decrease the weight of blades. Also, the sub-blades are exerted to bending moments, which implies that the sub-blades closest to the hub needs to be designed with regard to providing strength to the sub-blade rather than aerodynamic properties.

U.S. Pat. No. 1,820,529 discloses a propeller blade provided with a plurality of aero-foils, that merge at an apex. Each aero-foil slopes outward towards a supporting end where it is rigidly fixed to a common blade axis. A plurality of shelves are positioned to be clamped between the plurality of aerofoils, substantially parallel to the blade axis. Also, an oblique tie structure is rigidly secured to cross-brace one aerofoil with respect to the others of a given blade along the length thereof.

SUMMARY OF THE INVENTION

It is an object of the invention to provide a design of a blade for a rotor of a wind turbine that allows for manufacture of rotor blades that are long and strong, while being light. It is a further object of the invention to provide a light weight blade while not substantially affecting the efficiency of the wind turbine.

These and other objects of the invention are at least partly met by the invention as defined in the independent claims. Preferred embodiments are set out in the dependent claims.

According to a first aspect of the invention, there is provided a blade for a rotor of a wind turbine, said blade comprising: a truss-like three-dimensional structure having strut members forming the truss-like structure, wherein a plurality of the strut members in the truss-like structure has an airfoil-shaped cross-section.

As used herein, a "truss-like structure" should be construed as a three-dimensional framework of members. The framework thus constitutes a three-dimensional structure that forms the overall shape of the blade. A truss is a structure that is formed by straight members (struts) that are connected at joints to form units of triangles. The structure should have enough members to make it stable and rigid against forces acting at the joints. The members should furthermore be free to rotate around the joints. In a truss, moments (torques) cannot be transferred within the truss and the members are therefore subjected to only axial forces (tensile and compressive forces). Within the context of this application, the "truss-like structure" should be construed as a truss, but not necessarily having joints that cannot transfer any moments. For instance, at least three members may be connected at a joint, but not all members need to be connected at exactly a single point. Rather, one or two of the members may be connected close to the joint, but not in an exact single position connecting all members at the joint. A two-dimensional truss is one where all the members and joints lie within a two dimensional plane, while a three-dimensional truss has members and joints extending into three dimensions. In fact, a three-dimensional truss is the union of tetrahedron units such that, for stiff members, it forms a rigid configuration against forces acting at the joints in any directions. This is not the case for a two-dimensional truss. Hence, the "the truss-like three-dimensional structure" should be construed as a "truss-like structure" comprising tetrahedron units. An individual member in the structure may be part of a plurality, such as two or more, of tetrahedron units.

It is an insight of the invention that the blade for a rotor of a wind turbine may be formed by a truss-like structure. Thanks to the truss-like structure, the strut members will generally only be exerted to tensile or compressive forces. Hence, the truss-like structure may form a strong and stable structure although individual strut members of the truss-like structure may be relatively thin and light weight. Therefore, by means of the invention, it is possible to form a blade for a rotor of a wind turbine that is considerably longer, stronger and lighter than a blade having a unitary shape.

The blade according to the invention may be formed as a cantilevered structure. Hence, the blade is arranged to be anchored only at a root portion closest to a hub of the wind turbine. The blade will therefore need to withstand the forces exerted on the cantilevered structure. Thanks to the truss-like structure of the blade, a strong and stable structure is provided.

Further, the truss-like structure according to the invention is provided with a plurality of strut members that have an airfoil-shaped cross-section. This implies that strut members that are part of the truss-like structure are shaped so as to cause a lift force on the blade as a wind passes the blade. Hence, the truss-like structure not only provides a light and stable structure of the blade but also provides the blade with characteristics for causing the blade to rotate as the blade is exerted to a blowing wind.

The strut members having an airfoil-shaped cross-section are supported by the truss-like structure. Hence, the design of the strut members need not be particularly constrained by requirements that the strut member has a stiffness that withstand the aerodynamic loads and gravity loads exerted on the blade. This implies that the shape of the strut members may be optimized to aerodynamic properties, even for parts of strut members closest to the hub of the rotor.

The plurality of strut members having an airfoil-shaped cross-section may be arranged such that the airfoil-shape of the strut members is substantially similarly angled in relation to a cross-sectional direction of the blade. This implies that the airfoil-shape of the plurality of strut members will cooperate so that a large common lift force may be generated by the wind acting on the blade. Also, the blade may be turned in relation to a wind direction such that the airfoil-shapes of the strut members are arranged with a common angle of attack against the wind direction. Hence, the lift force commonly generated by the plurality of strut members may be easily controlled and optimized by controlling the relation of the blade to the wind direction. It should however be realized that the air passing one strut member will affect the air flow around the strut member. Hence, if the strut members are arranged in close relation to each other, the angle of attack of the airfoil-shapes of adjacent strut members may need to be slightly different in order to account for the effect of the strut members on the air flow and optimize the common lift force generated by the plurality of strut members.

The truss-like structure implies that the shape of the blade is not entirely optimized from an aerodynamic point of view. Since the structure comprises a plurality of members, air passing over the plurality of members will contribute to increasing the drag force on the blade. However, a lift-to-drag ratio of the blade may still be relatively good and not differ substantially from a blade having a unitary shape. Therefore, while the efficiency of the blade may not be as good as an equally long blade having a unitary shape, the light weight of the truss-like structure may allow construction of a wind turbine of much larger dimensions so as to provide a large power production capacity of the wind turbine. Also, the light truss-like structure allows a relatively small amount of material to be used in the manufacture of the wind turbine, wherein not only the blades but also a tower and foundation of the wind turbine may need less material due to the lower weight of the blades. Hence, the material cost of the wind turbine will be decreased.

It may be particularly advantageous to use a blade comprising a truss-like structure in an off-shore wind turbine, since transportation of parts of the wind turbine to an off-shore site may be relatively easy using ships. Thus, the size of off-shore wind turbines may be increased thanks to the use of light-weight blades. However, blades comprising a truss-like structure may also advantageously be used in land based wind turbines, wherein the light weight of the blades may facilitate transport and also allow installing wind turbines at sites that are difficult to access.

The truss-like structure of the blade may provide a relatively small deflection of a tip of the blade thanks to a large flexural rigidity of the blade. In strong winds, the deflection of the tip may become so large that the blade may hit the tower when rotating. Hence, by providing a blade with large flexural rigidity, the wind turbine may be able to operate in strong winds, increasing the percentage of time that the wind turbine is operational and hence increasing the overall efficiency of the wind turbine.

The blade comprising a truss-like structure may be arranged to be compatible with existing HAWT designs and specifically to fit to the hub of existing HAWTs. This implies that the blade may be used with existing HAWTs and that it may not be necessary to install completely new wind turbines in order to make use of the blades according to the invention.

Further, it should be realized that a blade according to the invention may also be used with a VAWT, providing the blade of a VAWT with a truss-like structure in order to provide a light weight blade to a VAWT.

The blade may be delivered in parts to a site where a wind turbine is to be installed. For instance, the blade may be delivered as separate individual members of the truss-like structure. Alternatively, the blade may be delivered as sections of assembled members of the truss-like structure. It should be realized that the blade may be partitioned in a number of different ways for the transport in order to suit the transportation method and the amount of installation work that may be appropriate at the site.

Further, a blade according to the invention need not be based entirely on a uniform truss-like structure. For instance, the gravity loads on the tip of the blade are not as large as closer to the hub. This implies that the truss-like structure may not need to be designed at the tip of the blade to withstand as large loads. Therefore, the truss-like structure at the tip of the blade may comprise fewer members than the truss-like structure closer to the hub. It should be realized that the truss-like structure may be varied between different parts of the blade for other reasons as well.

According to a second aspect of the invention, there is provided a section of a blade for a rotor of a wind turbine, said section comprising: a first and a second connector, each extending in a cross-sectional direction of the blade; a first and a second longitudinal strut member, each extending substantially along a longitudinal direction of the blade and being connected to the first and second connectors; and a diagonal strut member extending from a connection point between the first longitudinal strut member and the first connector to a connection point between the second longitudinal strut member and the second connector; wherein at least a longitudinal strut member or a diagonal strut member has an airfoil-shaped cross-section.

A section of a blade according to the second aspect of the invention may be suitable for transport to a site where the wind turbine is to be installed. Hence, several such sections may be connected at the site for forming the entire blade. The sections may be connected by means of a connector of a first section being attached to a connector of a second section.

The dimensions of the sections may be gradually decreasing so that a blade may be formed having a tip portion that has a smaller cross-section than a root portion closest to the hub. Hence, the first connector of the section may be larger than the second connector in order to provide a blade that is gradually narrowing towards the tip.

Also, the truss-like structure of the sections need not be identical for different sections. For instance, the truss-like structure of a section close to the tip may comprise fewer members than the truss-like structure of a section closer to the hub, since the section close to the tip is exerted to smaller gravity loads.

A diagonal strut member, a longitudinal strut member and a connector together form a triangular shape by means of how they are connected in the section. This implies that the section provides a truss-like structure and will therefore provide a strong and stable structure to the blade as discussed above with regard to the first aspect of the invention. A section may be provided with a plurality of diagonal strut members extending from a connection point between a longitudinal strut member and the first connector to a connection point between another longitudinal strut member and the second connector. The number of diagonal strut members may be varied in several ways so as to form different types of truss-like structures. The number of diagonal strut members associated with pairs of longitudinal strut members in the truss-like structure may also vary in the truss-like structure. The diagonal strut members may be attached to the connectors at the connection points. Alternatively, the diagonal strut members may be attached to the longitudinal strut members at the connection points. As a further alternative, the diagonal strut members, longitudinal strut members and connectors may be connected by pin joints at the connection points so as to form a true truss structure.

A diagonal strut member may be attached in the actual connection point between the longitudinal strut member and the connector. However, it should be realized that the diagonal strut member may alternatively be attached to the connector or the longitudinal strut member in the vicinity of the connection point. Hence, the diagonal strut member, the longitudinal strut member and the connector may form a shape which is close to triangular. This may be sufficient in order to form a truss-like structure providing a strong and stable structure to the blade.

The first and second longitudinal strut members may have an airfoil-shaped cross-section. Since the longitudinal strut members extend in the longitudinal direction of the blade, an airfoil-shaped cross-section of the longitudinal strut members will act to generate a lift force in the rotational direction of the blade as the blade is subject to wind.

The diagonal strut members may alternatively or additionally have an airfoil-shaped cross-section. The diagonal strut members extend in the longitudinal direction of the blade, even though not being parallel to the longitudinal direction. This implies that an airfoil-shaped cross-section of the diagonal strut member may act to generate a lift force in the rotational direction of the blade. Further, an airfoil-shaped cross-section of a diagonal strut member may be advantageous for avoiding flutter or vibrations to arise in the diagonal strut member.

The strut members that have an airfoil-shaped cross-section may be arranged to have a relatively large dimension of the cross-section so as to increase the surface that is subject to a blowing wind and provide a large lift force. The thickness of a strut member should be sufficient to provide adequate support of the structure of the blade. However, in order for the strut member to provide a desired lift force when subject to a blowing wind, the cross-sectional dimensions of the strut member may need to be increased. Hence, such strut members may be designed to have a desired cross-section in order to provide the desired aerodynamic properties when subject to a blowing wind. In one embodiment, the strut members may be at least partly hollow so that the desired outer dimensions of the strut members from an aerodynamic point of view may be achieved while the amount of material for manufacture of the strut member is restrained.

According to an embodiment, there is provided three longitudinal strut members having an airfoil-shaped cross-section that is adapted to generate a desired lift force when subject to a blowing wind. Hence, the cross-sectional dimensions of the longitudinal strut members are relatively large. The longitudinal strut members may in such case form sub-blades that are mainly responsible for driving the rotation of the blade when it is subject to a blowing wind.

According to a third aspect of the invention, there is provided a sub-blade for a blade for a rotor of a wind turbine, wherein the sub-blade is elongate and has an airfoil-shaped cross-section, proportions of the airfoil-shaped cross-section of the elongate sub-blade being constant over substantially the entire length of the elongate sub-blade, wherein the sub-blade is manufactured with a rotational angle of the airfoil-shaped cross-section around a longitudinal axis of the sub-blade being constant and the sub-blade is configured to enable turning the airfoil-shaped cross-section around the longitudinal axis differently along the longitudinal axis so as to provide a twisting of the sub-blade along its longitudinal axis.

The sub-blade according to the invention is suitable for use in a blade for a rotor of a wind turbine according to the first aspect of the invention. The sub-blade may be transported as a separate part to a site where the wind turbine is to be installed.

The sub-blade may be provided with constant proportions of the airfoil-shaped cross-section along substantially the entire length of the sub-blade. The sub-blade design need not be heavily adapted to requirements of strength of the blade at the root portion, such that the sub-blade design even at the root portion may be provided with an airfoil-shaped cross-section. When the sub-blade is made part of a blade according to the first aspect of the invention, the truss-like structure of the blade may contribute to the strength of the blade such that the sub-blade design may principally be directed to achieving good aerodynamic properties of the sub-blade.

The sub-blade may be manufactured as a straight, elongate element, i.e. a rotational angle of the airfoil-shaped cross-section around a longitudinal axis of the sub-blade is constant throughout the length of the sub-blade. This may facilitate manufacture of the sub-blade.

Since the tip of the blade moves faster through the air than the root of the blade, the apparent wind angle differs between the tip of the blade and the root of the blade. Therefore, in an installed wind turbine, it may be desired that the sub-blade is twisted, i.e. the rotational angle of the airfoil-shaped cross-section around the longitudinal axis of the sub-blade differs along the length of the sub-blade, so that the angle of attack of the sub-blade to the apparent wind angle is constant along the longitudinal axis of the sub-blade. However, the sub-blade may be adapted to be part of a structure of the blade. Hence, a twisting of the sub-blade may be achieved by forcing the twist on the blade during assembly of the blade. For instance, connectors of the blade may be arranged to control the rotational angle of the airfoil-shaped cross-section of the sub-blade such that a twisting of the sub-blade is achieved when the sub-blade is mounted to connectors.

According to a fourth aspect of the invention, there is provided a connector for connecting sub-blades of a blade for a rotor of a wind turbine, said connector comprising: a plurality of plate-like structures, each having a through-going hole for receiving a sub-blade; wherein the plurality of plate-like structures are connected to each other for connecting the sub-blades of the blade.

It is advantageous that the plate-like structures have as little surface as possible. This is due to safety reasons, lowering mass, ease of transportation and aerodynamic efficiency and becomes increasingly important the larger the structure is. The plate-like surface can be minimized by letting a shape of the connector approach a triangle formed by three struts that are connected to the sub-blades.

The connector is suitable for use in a blade according to the first aspect of the invention. A blade may comprise a plurality of connectors, which may be mounted at different positions along the length of the blade. The connectors may be separately manufactured and delivered to a site where the wind turbine is to be installed for mounting of the blade on site.

A connector may comprise a through-going hole for controlling a position of a sub-blade in relation to the connector. According to an embodiment, the through-going hole is angled in the plate-like structure so as to control a rotational angle of the airfoil-shaped cross-section around a longitudinal axis of the sub-blade. A series of connectors may thus be arranged to be positioned along the length of the blade for controlling or causing a twisting of the sub-blades.

The plate-like structures of the connector may be constructed by an inner part and an outer part, such that the outer part may be attached to the inner part once the inner part has been positioned correctly in relation to the sub-blades. This implies that the sub-blades may not need to be guided through the connector during mounting of the blade. Rather, the plate-like structures of the connector may be assembled, when the connector is in its proper position around the sub-blades.

Since the connector has plate-like structures around the sub-blades, which structures are connected to each other, the connector may be formed as a plurality of plates having joining parts between them and the connector may have a hole between the joining parts. This implies that the connector may be manufactured using a small amount of material.

The connector may also function as a winglet. This implies that the connector may act to decrease air flow along a longitudinal direction of the blade. Hence, air flow over the tip of the blade may be decreased, which may prevent loss in efficiency of the blade at the tip of the blade.

According to a fifth aspect of the invention, there is provided a method for assembly of a blade for a rotor of a wind turbine, said method being performed at a site of the wind turbine and comprising: delivering a plurality of connectors to the site, each connector comprising a plurality of plate-like structures, each having a through-going hole, wherein the plurality of plate-like structures are connected to each other; delivering a plurality of elongate sub-blades having an airfoil-shaped cross-section; inserting each sub-blade through a through-going hole of each connector, wherein the through-going holes are differently angled in the connectors so as to control a twist of the airfoil-shaped cross-section of the sub-blade along a longitudinal direction of the sub-blade.

According to the method, a blade may be assembled providing sub-blades that may present aerodynamic properties for the blade and connectors joining the sub-blades to form a common blade. The method is especially suitable for assembly of blades on a site where a wind turbine is to be installed. Hence, the parts of the blade may be transported to the site separately.

The method may further comprise attaching diagonal strut members to extend from a connection point between a first sub-blade and a first connector to a connection point between a second sub-blade and a second connector. This implies that a truss-like structure may be formed by the sub-blades, connectors, and the diagonal strut members so as to form a strong blade. The diagonal strut members may also be separately transported to the site and may be mounted in the blade at the site.

According to an embodiment of the first aspect of the invention, the truss-like structure comprises a plurality of longitudinal strut members extending substantially along a longitudinal direction of the blade, wherein the longitudinal strut members have an airfoil-shaped cross-section. Since the longitudinal strut members extend in the longitudinal direction of the blade, an airfoil-shaped cross-section of the longitudinal strut members will act to generate a lift force in the rotational direction of the blade as the blade is subject to a blowing wind.

According to another embodiment, the truss-like structure further comprises at least one connector, wherein the at least one connector is arranged to extend in a cross-sectional direction of the blade and is connected to a plurality of longitudinal strut members extending substantially along a longitudinal direction of the blade. The connector may join the longitudinal strut members to each other. The connector may also be arranged to control the positioning of the longitudinal strut members in relation to each other and the orientation of the airfoil-shaped cross-section of the longitudinal strut members in the blade so as to ensure that the blade exhibits good aerodynamic properties.

According to another embodiment, the truss-like structure further comprises a plurality of diagonal strut members, wherein a diagonal strut member extends from a connection point between a first longitudinal strut member and a first connector to a connection point between a second longitudinal strut member and a second connector. A diagonal strut member, a longitudinal strut member and a connector may thus together form a triangular shape by means of how they are connected. This implies that the diagonal strut member, the longitudinal strut members and the connectors may form a series of triangles so as to implement a truss-like structure. Together, the triangles form a structure that is the union of tetrahedron units.

According to another embodiment, the at least one connector comprises a plate-like structure having a through-going hole for receiving a longitudinal strut member. The through-going hole may thus act to control the positioning of the longitudinal strut member in the blade.

According to an embodiment, the through-going hole is angled in the plate-like structure so as to control a twist of the longitudinal strut member along the longitudinal direction of the blade. The orientation or angle of the through-going hole may control the orientation of the longitudinal strut member in relation to a connector. A series of connectors may have differently angled through-going holes so that when a longitudinal strut member is arranged to run through the series of connectors, a twisting of the longitudinal strut member may be achieved.

According to an embodiment, proportions of the airfoil-shaped cross-section of the longitudinal strut members are constant over substantially the entire length of the longitudinal strut members. In particular, the longitudinal strut members may have an airfoil-shaped cross-section at the root portion of the longitudinal strut member so that the root portion of the longitudinal strut member may contribute to driving the rotation of the blade.

According to an embodiment, the longitudinal strut members are separated along an entire longitudinal direction of the blade. This implies that the flows around individual longitudinal strut members will interfere with each other and thus negatively affect aerodynamic efficiency of the blade. In particular, the longitudinal strut members may be separated at a tip of the blade, where most of the power is extracted from the wind.

In an embodiment, the longitudinal strut members may be separated by a minimum distance, which is related to a chord length of the longitudinal strut members. For instance, the minimum distance may be set as a factor times the chord length, wherein the factor may be 1. However, in an embodiment, the factor may be at least 2, which may provide a separation of the longitudinal strut members such that the blade has good aerodynamic efficiency.

According to a sixth aspect of the invention, there is provided a wind turbine, comprising at least one blade according to the first aspect of the invention. The wind turbine may thus make use of the light weight properties of the one or more blades so that a large-scale wind turbine may be formed or that the cost of manufacture of the wind turbine may be restrained by means of the small amount of material required.

BRIEF DESCRIPTION OF DRAWINGS

These and other aspects of the present invention will now be described in further detail, with reference to the appended drawings showing embodiment(s) of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
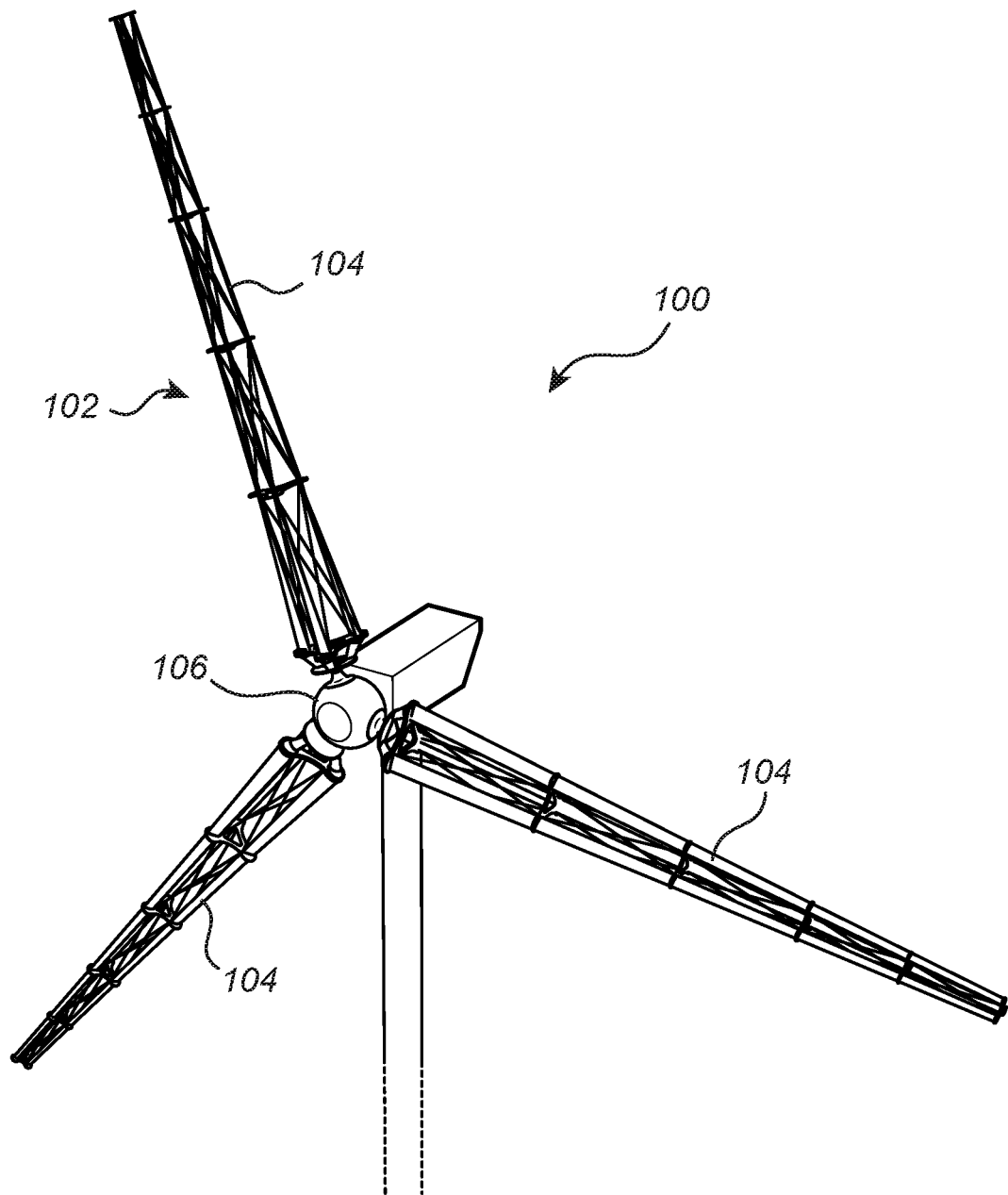
FIG. 1 is a schematic view of a horizontal axis wind turbine.

Referring now to FIG. 1, a horizontal-axis wind turbine 100 is shown. The wind turbine 100 comprises a rotor 102. The rotor 102 has blades 104 and a central hub 106 to which the blades 104 are attached such that the blades 104 form cantilevered structures that are anchored only to the central hub 106. The rotor 102 captures energy of a mass of air that passes the rotor 102 due to a blowing wind. The energy is captured by means of the wind forcing the blades 104 to bring the rotor 102 to rotate. The rotor 102 is then connected in the wind turbine 100 to a generator (not shown) for converting the captured energy into electrical power.

The rotor 102 may comprise three blades 104 as shown in FIG. 1. However, the rotor 102 may alternatively be provided with another number of blades 104, such as one, two or even more than three blades 104.

The wind turbine 100 may be actively controlled so that the rotor 102 is turned to face the wind direction. This implies that the wind turbine 100 may be able to as efficiently as possible capture the energy in the blowing wind.

The blade 104 is shaped so that air passing the blade 104 will create a lift force on the blade 104 in the rotational direction of the blade 104. In this regard, the blade 104 may comprise an airfoil-shape, which implies that the pressure will differ on different sides of the airfoil-shape generating the lift force. The blade 104 may be arranged so that the airfoil-shape is tilted in relation to the wind direction. The tilt angle is called an angle of attack. The angle of attack may affect the lift force of the blade 104 and at a critical angle of attack a maximum lift force is generated by the airfoil-shape.

Figure 2:
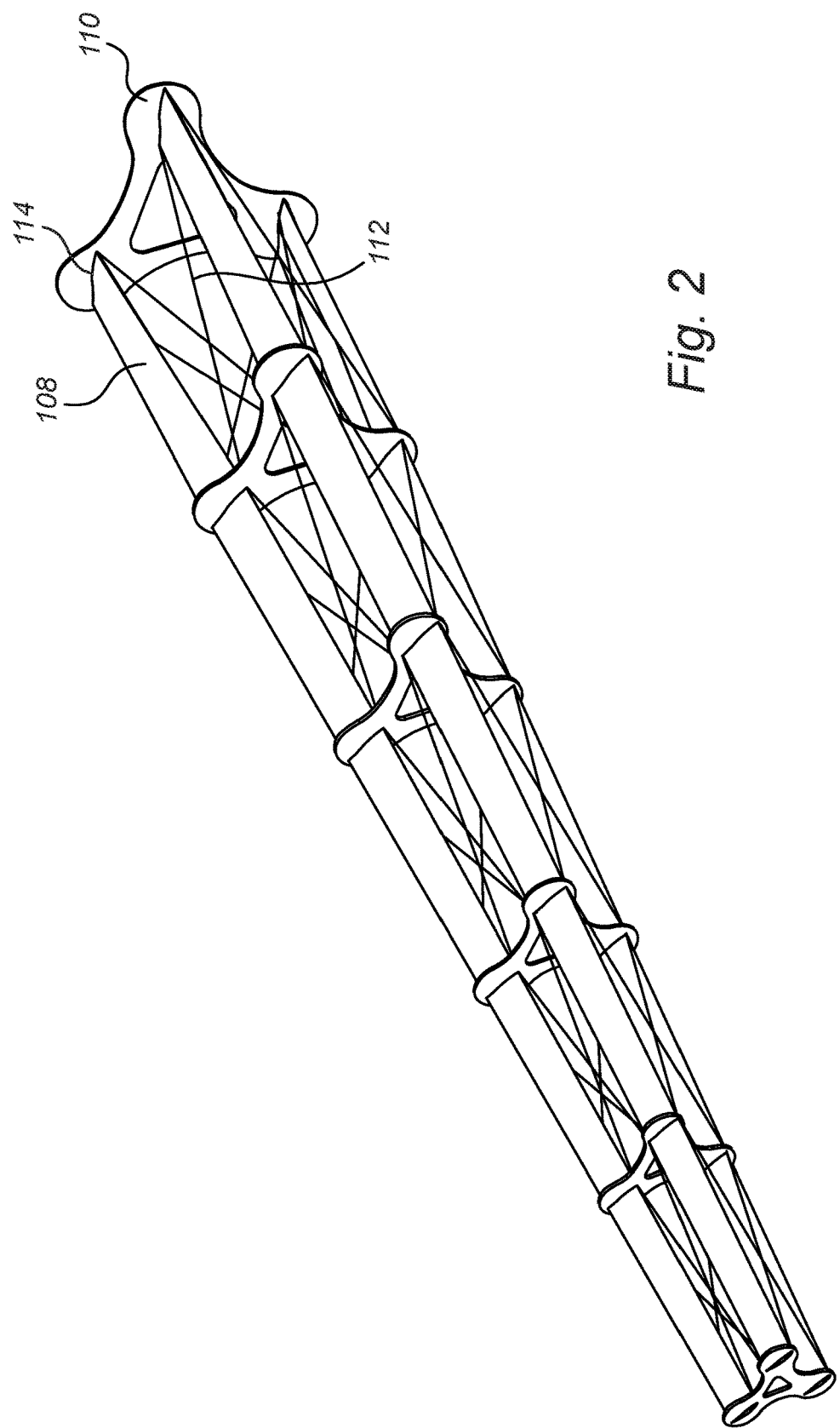
FIG. 2 is a perspective view of the blade according to an embodiment of the invention.

Referring now to FIG. 2, a blade 104 according to the invention will be further described. The blade 104 comprises a truss-like structure having members that form a number of triangles. The truss-like structure implies that the individual members are principally only subject to tensile and compressive forces, which means that the members may be made thin while maintaining a strong overall structure.

The truss-like structure may comprise longitudinal strut members 108, extending in a longitudinal direction of the blade 104, connectors 110 extending in a cross-sectional direction of the blade 104 and diagonal strut members 112 extending diagonally through the blade 104 between two connectors 110. The members are attached to each other in such manner as to form triangles, which are defined by a longitudinal strut member 108, a diagonal strut member 112 and a connector 110. Together, the triangles form a structure that is the union of tetrahedron units.

Since the members of the truss-like structure may be very thin, the overall weight of the blade 104 is low. A light weight blade 104 has a number of advantages. For instance, a small amount of material is required for the manufacture of the blade 104, which makes the cost of the blade 104 low. The light weight of the blade 104 implies that gravity loads are limited, which also limits problems due to associated fatigue of the blade 104.

Also, the truss-like structure provides a large flexural rigidity of the blade 104. Hence, problems due to deformation of the blade 104 and torsion loads on the blade 104 are limited. Further, the flexural rigidity may limit a deflection of a tip of the blade 104, such that the wind turbine 100 may be able to operate in strong winds without a risk of the tip of the blade 104 hitting the tower. Thus, the percentage of time that the wind turbine 100 is operational may be increased and hence the overall efficiency of the wind turbine 100 may be increased.

Further, a light weight blade 104 limits forces on other structures of the wind turbine 100, such as a tower and a foundation of the wind turbine 100. Hence, the tower and foundation may also be relatively light weight, since they need only support a light weight blade 104 decreasing manufacturing costs of these parts of the wind turbine 100.

The truss-like structure is especially suited for transportation in parts, such that the blade 104 may be transported in parts to a site where the wind turbine 100 is to be installed and assembled at the site. Also, the light weight of the blade 104 makes the blade 104 or the parts of the blade 104 easier to transport to a site where the wind turbine 100 is to be installed and the installation of the wind turbine 100 is facilitated as well.

The light weight and the flexural rigidity of the blade 104 may thus enable installing large-scale wind turbines 100, which may otherwise not be possible due to forces on the parts of the wind turbine 100. This may be especially suitable for off-shore wind turbines 100. Off-shore wind turbines 100 are often of larger scale than land based wind turbines 100, since it may be easier to transport large parts to off-shore sites using ships and the wind turbine 100 may be placed remotely such that noise created by the wind turbine 100 may not affect or disturb people.

The light weight of the blade 104 and the ability to transport the blade 104 in parts may also facilitate transport of the blade 104, such that wind turbines 100 may be installed at sites which may otherwise be difficult to access.

However, the utility of a light weight blade 104 is not limited to large-scale wind turbines 100. Since manufacturing costs of the blade 104 may be relatively low, a wind turbine 100 using the light weight blade 104 may be cheaper to manufacture and install, regardless of size of the wind turbine 100.

The truss-like structure implies that air may pass over a plurality of members in the blade 104. The air passing over the plurality of members will contribute to increasing the drag force on the blade 104 decreasing efficiency of capturing the wind energy. However, as further shown in the example below, lift-to-drag ratio of the blade 104 may still be relatively good and not differ substantially from a blade 104 having a unitary shape. Further, as the truss-like structure of the blade 104 may allow installing a larger scale wind turbine 100 than otherwise possible, the power production capacity of the wind turbine 100 may still be significantly increased.

At least some of the members of the truss-like structure may have an airfoil-shaped cross-section so as to generate a lift force. In an embodiment, as shown in FIG. 2, the longitudinal strut members 108 may be arranged to have an airfoil-shaped cross-section and may be designed and dimensioned based on desired aerodynamic properties. The longitudinal strut members 108 may thus have dimensions much larger than required in order to provide adequate support of the truss-like structure. Rather, the longitudinal strut members 108 may be sized to provide a large cross-section such that a large lift force may be generated. As such, the longitudinal strut members 108 may form sub-blades.

The diagonal strut members 112 may be arranged to mainly provide support in the truss-like structure. The diagonal strut members 112 may thus be arranged to withstand tension and compression loads. The diagonal strut members 112 may be arranged to be solid parts, which implies that the cross-sectional surface of the diagonal strut members 112 is kept small in order to limit the drag force created by the presence of the diagonal strut members 112.

The diagonal strut members 112 may further have an airfoil-shaped cross-section in order to further limit a drag force created by the diagonal strut member 112. Thus, the diagonal strut member 112 may also contribute to the lift force created by the blade 104. The diagonal strut member 112 should however be limited in the cross-sectional size so as to limit the lift force on the diagonal strut member 112. If the lift force becomes too large, there is a risk that the diagonal strut member 112 will bend.

The diagonal strut members 112 may be provided with a stream-lined cross-section. This implies that the cross-section has a symmetrical shape with a rounded form at a leading edge facing the wind and a pointed form at a trailing edge. The diagonal strut members 112 may further be oriented such that an angle of attack of the cross-section in relation to the wind direction is non-zero, which implies that a lift force is generated. The lift force generated on the diagonal strut members 112 may act to keep the diagonal strut member 112 in tension. This may act to prevent flutter or vibrations to arise in the diagonal strut members 112 when the blade 104 is subject to a blowing wind.

It should be realized that the size and shape of the cross-section of the diagonal strut members 112, as well as the angle of attack, may be varied in order to find an optimum design with regard to strength of the structure, the effect on the lift-to-drag ratio of the blade 104 and the avoidance of vibrations in the diagonal strut members 112.

The diagonal strut member 112 may further be arranged to be twisted, i.e. a rotational angle of the cross-section around a longitudinal axis of the diagonal strut member 112 differs along the length of the diagonal strut member 112. The diagonal strut member 112 is twisted in order to adapt to the fact that the speed of a portion of the diagonal strut member 112 closer to a tip of the blade 104 is faster than the speed closer to a root of the blade 104. By means of the diagonal strut member 112 being twisted, the angle of attack of the diagonal strut member 112 to the apparent wind angle may be constant along the longitudinal axis of the diagonal strut member 112.

A sub-blade 108 may be arranged to extend through a hole 114 in the connector 110. The arrangement of holes 114 in the connector 110 may thus provide the relative position of sub-blades 108 to each other. The hole 114 may thus constitute a connection point between the sub-blade 108 and the connector 110. The sub-blade 108 may be attached to the connector 110 in order to fix the position of the sub-blade 108 in relation to the connector 110.

The diagonal strut members 112 may be arranged to extend between a first connection point between a first sub-blade and a first connector and a second connection point between a second sub-blade and a second connector. The diagonal strut members 112 may be attached to the connectors 110 at the connection points. The attachment may e.g. be by bolts or welding of the diagonal strut members to the connection points. The diagonal strut members 112 are arranged in the vicinity of the hole 114 at the connection point so that the sub-blades 108 and the diagonal strut members 112 are attached to the connector 110 at positions close to each other. This implies that the triangles of the truss-like structure are formed in the blade 104.

The diagonal strut members 112 may alternatively be attached to the sub-blades 108 in the connection points. The diagonal strut members 112 may further be attached to the sub-blades 108 with a pin joint. In a special embodiment, the connectors 110 may be divided in parts extending between the sub-blades 108, wherein the connector parts and the diagonal strut members 112 are attached to the sub-blades 108 in common pin joints so as to form a true truss structure.

The arrangement of the diagonal strut members 112 in the structure may be varied in a number of ways. The diagonal strut members 112 may be arranged in accordance with a known truss structure.

Alternatively, as shown in FIG. 2, diagonal strut members 112 are arranged between each pair of connection points in two adjacent connectors 110. This implies that there is a pair of diagonal strut members 112 associated with each pair of longitudinal strut members 108 extending between two connectors 110. Hence, one diagonal strut member 112 in a pair of diagonal strut members 112 will be in tension while the other diagonal strut member 112 in the pair is compressed. The diagonal strut members 112 may then not be dimensioned as to completely withstand compressive forces. The overall strength of the blade 104 may still be sufficient, since the diagonal strut member 112 that is subject to tensile forces will maintain the overall structure of the blade 104. This arrangement of the diagonal strut members 112 may allow the diagonal strut members 112 to be very thin and/or the connectors 110 to be arranged at a large distance from each other in the longitudinal direction of the blade 104.

In an alternative embodiment, the diagonal strut members 112 may be arranged with an airfoil-shaped cross-section and may be designed and dimensioned based on desired aerodynamic properties. Hence, the diagonal strut members 112 may be designed for generating a lift force when the blade 104 is subject to a blowing wind. In this regard, the cross-section of the diagonal strut members 112 may be much larger than necessary to provide support of the truss-like structure and rather be sized to provide a large lift force to the blade 104. In such case, the longitudinal strut members 108 may be mainly providing support to the truss-like structure or alternatively, the longitudinal strut members 108 may also be sized to contribute substantially to the lift force of the blade 104. Where the longitudinal strut members 108 are mainly providing support to the truss-like structure, the longitudinal strut members 108 are subject to both tensile and compressive forces. Therefore, the longitudinal strut members 108 will need to be dimensioned so as to withstand deformation by these forces. The truss-like structure may in an embodiment comprise only one diagonal strut member 112 associated with each pair of longitudinal strut members 108. This implies that the airfoils of adjacent diagonal strut member 112 may be arranged sufficiently apart from each other so that the effect on the air flow of an airfoil does not substantially affect the lift force generated by the adjacent diagonal strut members 112. With this arrangement of the diagonal strut members 112, the distance between adjacent connectors 110 may need to be relatively short so that the overall strength of the blade 104 will be sufficient.

The truss-like structure of the blade 104 need not be identical throughout the entire length of the blade 104. Rather, a configuration of the truss-like structure may vary between different parts of the blade.

In one embodiment, the truss-like structure may be arranged according to different configurations in a tip portion of the blade 104 and a root portion of the blade 104. The gravity loads exerted on the blade 104 are much larger at the root portion of the blade 104. Hence, the configuration of the truss-like structure may be designed with this in mind.

For instance, a blade 104 may be designed with a truss-like structure as shown in FIG. 2 having a pair of diagonal strut members 112 associated with each pair of longitudinal strut members 108 extending between two connectors 110. However, at the tip portion of the blade 104, the truss-like structure may be configured to include only one diagonal strut member 112 associated with each pair of longitudinal strut members 108. This implies that the drag force created by the diagonal strut members 112 is limited, since the number of diagonal strut members 112 is decreased. Further, the speed of the blade 104 is largest at the tip of the blade 104, which implies that members at the tip of the blade 104 contribute most to the drag force. Hence, decreasing the number of members at the tip of the blade 104 may have a large effect on the lift-to-drag ratio of the blade 104. The tip portion of the blade 104 may preferably only comprise the diagonal strut members 112 which are exerted to tensile forces from the aerodynamic forces, so that vibrations and flutter of the diagonal strut members 112 may be avoided.

According to another embodiment, the root portion of the blade 104 may be designed with a special configuration of the truss-like structure in order to handle the large gravity loads that are exerted on the root portion of the blade 104.

Figure 3:
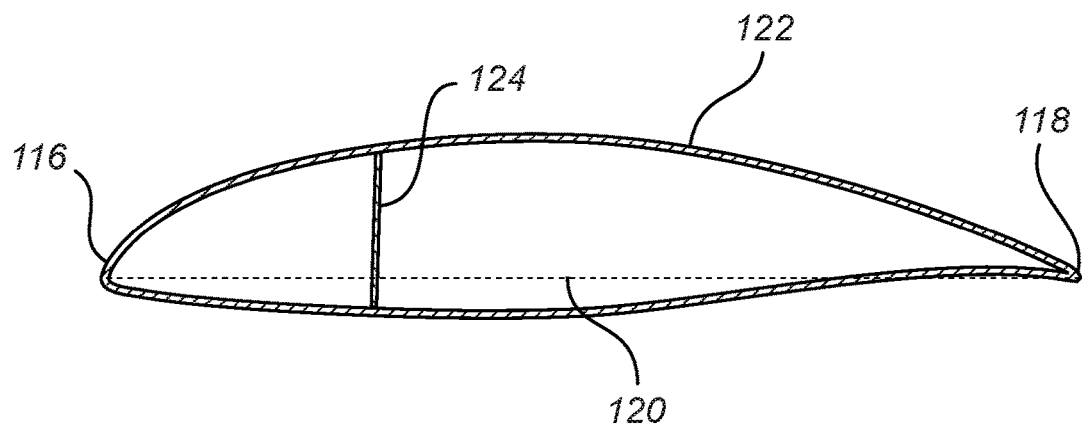
FIG. 3 is a schematic view of a cross-section of a sub-blade of the blade in FIG. 2.

Referring now to FIG. 3, showing a cross-section of a sub-blade 108, the sub-blade 108 of the blade 104 will be further described. The sub-blade 108 may have an airfoil-shaped cross-section in order to generate a lift force when subject to a blowing wind. The airfoil shape comprises a leading edge 116, which is a point at a front of the airfoil that has maximum curvature, and a trailing edge 118, which is a point at a rear of the airfoil that has maximum curvature. A chord line 120 is defined by a straight line connecting the leading edge 116 and the trailing edge 118. The angle of attack of the sub-blade 108 is defined by an angle of the chord line 120 in relation to the wind direction.

The sub-blade 108 may be arranged to have a constant airfoil shape of the cross-section through the length of the sub-blade 108. This implies that an airfoil shape chosen based on desired aerodynamic properties of the sub-blade 108 may be used in the entire length of the sub-blade 108 or at least in substantially the entire length of the sub-blade 108. In particular, thanks to the sub-blade 108 being part of the truss-like structure, the sub-blade 108 need not be designed at a root portion closest to the hub 106 to handle loads due to a heavy weight of the blade. The sub-blade 108 is arranged to be thinner at a tip portion of the blade 104 than at the root portion. However, the proportions of the airfoil-shaped cross-section of the sub-blade 108 may be constant in order to have a constant airfoil shape along the length of the sub-blade 108.

The sub-blade 108 may be arranged to have differing airfoil shapes along the length of the sub-blade 108. However, thanks to the sub-blade 108 being part of the truss-like structure, the design of the sub-blade 108 at the root portion may still be based on providing desired aerodynamic properties.

The sub-blade 108 may be hollow in order to provide a large surface while requiring a small mass. The surface of the sub-blade 108 may thus be formed by an outer shell 122. The shell 122 may be arranged to be very thin, having a thickness of typically a few millimeters.

The sub-blade 108 may further comprise a supporting structure 124 inside the shell 122. The supporting structure 124 may prevent deformation of the thin shell 122 due to e.g. aerodynamic loads. For instance, the supporting structure 124 may be provided as one or more I-beams in the shell 122, having flanges, also called caps, supporting opposite sides of the shell 122 and a web connecting the caps. The supporting structure 124 may alternatively be provided as a box spar having caps supporting opposite sides of the shell 122 and shear webs connecting ends of the caps to each other. The caps may be arranged in the shell 122 so as to be separated as far apart as possible.

The sub-blade 108 may be manufactured as an upper and a lower part, which may be sandwiched together with the supporting structure 124 arranged there between for forming the sub-blade 108.

The sub-blade 108 may be twisted so that a rotational angle of the airfoil-shaped cross-section around the longitudinal axis of the sub-blade differs along the length of the sub-blade 108. The sub-blade 108 may be twisted in order to adapt the aerodynamic properties of the sub-blade 108 to the fact that the speed of the tip portion of the sub-blade 108 is much larger than the speed of the root portion of the sub-blade 108 during rotation of the sub-blade 108. By means of the sub-blade 108 being twisted, the angle of attack of the sub-blade 108 to the apparent wind angle may be constant along the longitudinal axis of the sub-blade 108.

The sub-blade 108 may be twisted in the manufacturing of the sub-blade 108. However, since the sub-blade 108 is arranged in relation to connectors 110 in the blade 104, the arrangement of the sub-blade 108 into the connectors 110 may act to provide the twisting of the sub-blade 108. In such case, the sub-blade 108 may be manufactured as a straight element. For instance, the sub-blade 108 may be produced by glass fiber with a majority of the fibers being aligned along the length of the sub-blade 108.

The truss-like structure may comprise three sub-blades 108 as shown in FIG. 2. However, the truss-like structure may be arranged to comprise four or more sub-blades 108. A sub-blade 108 may partly block the wind for another sub-blade 108. Therefore, while it would be possible to provide the truss-like structure with a large number of sub-blades 108, it may be desired to keep the number of sub-blades 108 fairly low, such as 3-5.

In order to limit the interference of a sub-blade 108 with the wind passing the other sub-blades, the sub-blades 108 may be substantially separated from each other. According to one embodiment, the sub-blades 108 are separated by three times a chord length of the airfoil-shaped cross-section of the sub-blade 108. For aerodynamic efficiency reasons, the blades should be separated by some minimum distance. This is particularly important near the tip as this is where most of the power is extracted from the air. The minimum distance may be related to the chord length, such that the minimum distance may for instance be two chord lengths. Having the blades meeting at the tip, like for example when forming the structure as a triangular pylon, is not good for aerodynamic efficiency, since the flow around the individual airfoils will interfere with each other when the separating distance is low. The result would be a significant reduction in power production for such a structure compared to one where the minimum distance criterion is not violated.

Figure 4:
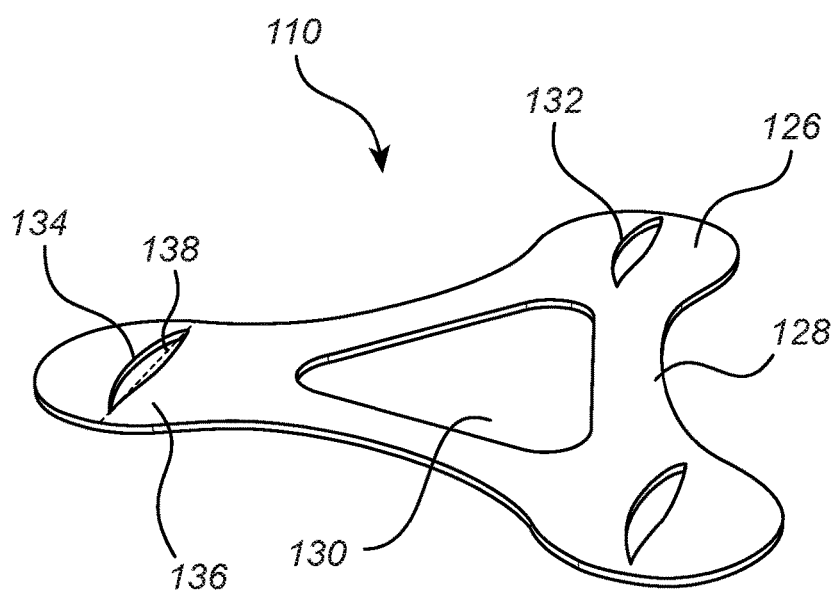
FIG. 4 is a perspective view of a connector of the blade in FIG. 2.

Referring now to FIG. 4, a connector 110 of the blade 104 will be further described. The connector 110 may be a relatively thin structure, which is arranged to extend in a cross-section of the blade 104. The thin structure of the connector 110 may thus ensure that the connector 110 has a small surface facing the wind direction in order to limit a drag force on the blade 104 caused by the connector 110. The connector 110 may further have a stream-lined shape with the surface facing the wind direction being rounded so that the drag force on the blade 104 is further limited.

The connector 110 will be subject to compressive forces in the truss-like structure. Hence, the structure of the connector 110 needs to be sufficiently thick and strong to withstand bending from the compressive forces.

The connector 110 comprises a plurality of plate-like structures 126. A plate-like structure 126 provides a connection point between a longitudinal strut member 108 and a diagonal strut member 112. Further, the connector 110 comprises joining parts 128 extending between the plate-like structures 126. In one embodiment, the plate-like structures 126 and the joining parts 128 are formed in a single body. However, different parts of the connector 110 may be attached to each other so as to form a unitary body.

The connector 110 may provide a plurality of connection points. For instance, in the truss-like structure as shown in FIG. 2, the connector 110 has two connection points arranged at each side of each plate-like structure 126. Hence, the connector 110 forms a part of the truss-like structure of the blade 104.

Since the connector 110 is arranged to have joining parts 128 between the plate-like structures 126, there may be arranged a large hole 130 in the structure of the connector 110 between the joining parts 128. This implies that the amount of material needed for manufacturing the connector 110, and thus the weight of the connector 110, may be reduced. Further, the total surface of the connector 110 may be limited by the arrangement of a hole in the structure of the connector 110, which may limit a drag force on the blade 104 caused by the connector 110.

However, it should be realized that the connector 110 may alternatively be formed as a single plate-like structure presenting a plurality of connection points between longitudinal strut members 108 and diagonal strut members 112.

The plate-like structure 126 of the connector 110 may be provided with a through-going hole 132 for receiving a sub-blade 108. The through-going hole 132 may thus define a connection point in the plate-like structure 126 and a diagonal strut member 112 may be attached to the plate-like structure 126 in the vicinity of the through-going hole 132.

The through-going hole 132 may be airfoil-shaped so as to fit the shape of the sub-blade 108. The sub-blade 108 may thus be arranged in the through-going hole 132 having a snug fit between the outer shape of the cross-section of the sub-blade 108 and the shape of a wall in the plate-like structure 126 defining the through-going hole 132.

The through-going hole 132 may further be angled in the plate-like structure 126 so as to fit a rotational angle of the airfoil-shaped cross-section around a longitudinal axis of the sub-blade 108. The through-going holes 132 may be differently angled in different connectors 110 in the blade 104 in order to fit a twisting of the sub-blades 108. As described above, the sub-blades 108 may be manufactured as straight elements. In such case, the angle of the through-going holes 132 may act to control the twisting of the sub-blades 108.

According to an embodiment, an outer portion 134 of the plate-like structure 126 may be attached to an inner portion 136 of the plate-like structure 126 during assembly of the blade 104. A separation of the outer portion 134 and the inner portion 136 is indicated by the dashed line 138 in FIG. 4. Walls of the outer portion 134 and the inner portion 136 may each partly define the through-going hole 132. This implies that, during assembly of the blade 104, the inner portion 136 of the plate-like structure 126 may first be arranged in relation to the sub-blade 108. Then, when the sub-blade 108 is properly positioned in relation to the plate-like structure 126, the outer portion 134 may be attached to the inner portion 136 so that the outer portion 134 and the inner portion 136 together encompass a cross-section of the sub-blade 108. According to this arrangement, the sub-blade 108 does not need to be guided through the through-going hole 132 for mounting of the sub-blade 108 in relation to the connector 110.

The blade 104 may comprise a plurality of connectors 110. The blade 104 may be gradually narrowing towards the tip portion. Accordingly, the size of the connectors 110 may differ depending on its longitudinal position in the blade 104. A connector 110 having a large size may also be thicker than a small-size connector in order to support the larger structure and larger loads of the connector 110.

According to an embodiment, the connectors 110 may be equally spaced in the longitudinal direction of the blade 104. However, a connector 110 may alternatively be arranged at a distance to the adjacent connector such that a ratio between the distance to the adjacent connector and a spacing between the sub-blades 108 in the connector 110 is constant. This implies that the distance between the connectors 110 may be larger at the root portion of the blade 104, where the spacing between the sub-blades 108 is larger. According to such an arrangement, an angle of the diagonal strut members 112 to the sub-blades 108 is equal throughout the blade 104.

The blades 104 may be assembled at the site where the wind turbine 100 is to be installed. This implies that the blades 104 may be transported to the site in pieces, which are assembled at the site to form the blade 104. A number of different ways of partitioning the blade 104 for transport may be contemplated.

For instance, each individual member of the truss-like structure may be transported as a separate part. Hence, the sub-blades 108, the connectors 110 and the diagonal strut members 112 may each be separately transported.

The sub-blades 108 may be delivered as straight elements. The sub-blades 108 may be guided through the connectors 110 during assembly of the blade 104, whereby a twisting of the sub-blade 108 may be forced by the arrangement of the through-going holes 132 in the connectors 110.

The sub-blades 108 are very long, since they extend through the entire length of the blade 104. Thus, in order to facilitate transport of the blade 104, the sub-blades 108 may be separated into several parts. In one embodiment, the sub-blades 108 are formed as longitudinal strut members 108, which each extend between two adjacent connectors 110 in the blade 104. Hence, a longitudinal strut member 108 may be attached to a connector 110 at the connection point of the connector 110. The connector 110 need not comprise a through-going hole 132. Rather, two longitudinal strut members 108 are attached to each side of the connector 110. Alternatively, the sub-blade 108 may be assembled from several parts at the site in order to facilitate transport of the sub-blade 108 to the site. The sub-blade 108 may then be assembled to the connectors 110 by guiding the sub-blade through the through-going holes 132.

Figure 5:
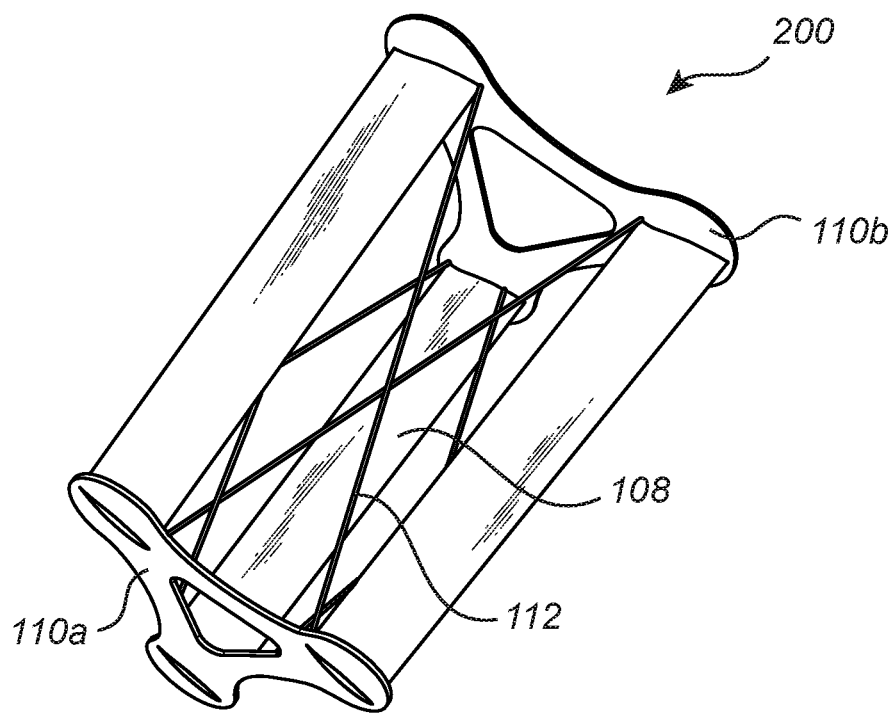
FIG. 5 is a perspective view of a section of the blade in FIG. 2.

According to another embodiment, sections of the blade 104 are pre-assembled and transported in the pre-assembled state. Then, the sections of the blade 104 may be attached to each other at the site for final assembly of the blade 104. A section 200 may be formed as illustrated in FIG. 5. The section 200 comprises a first connector 110a and a second connector 110b, the first and second connectors 110a, 110b being adjacent connectors in the blade 104. The section 200 further comprises the longitudinal strut members 108 and the diagonal strut members 112 between the connectors 110a, 110b. Hence, the longitudinal strut members 108 and the diagonal strut members 112 are mounted to the connectors 110 before transport to the site. At the site, sections 200 may be attached to each other for final assembly of the blade 104.

The sections 200 may be attached to each other by means of connectors 110 of the sections 200 being attached to each other. Hence, the connectors 110 of the assembled blade 104 may be jointly formed by two sections 200 being attached to each other. For instance, each section 200 may provide half the thickness of the connector 110 in which the sections 200 are attached to each other.

Figure 6:
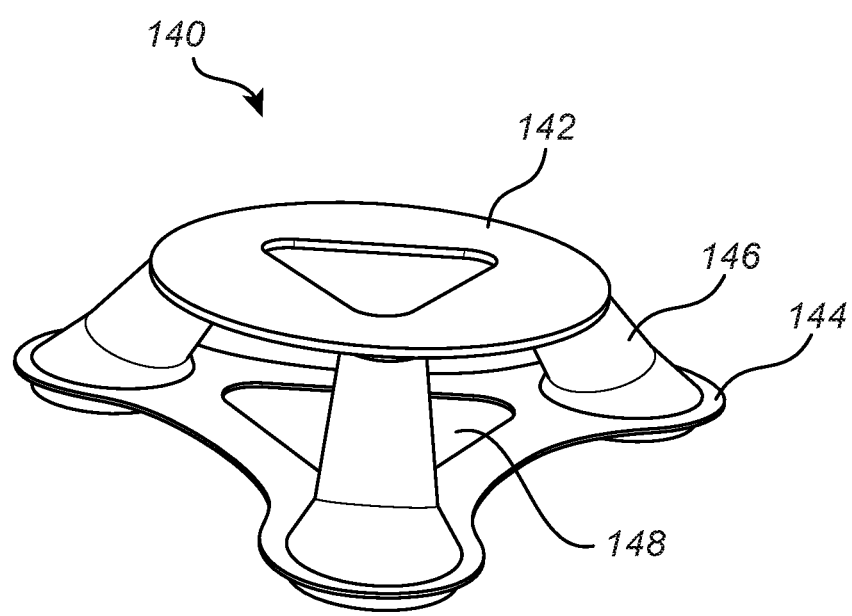
FIG. 6 is a schematic view of a root connector for the blade in FIG. 2.

Referring now to FIG. 6, a root connector 140 will be described. The root connector 140 is arranged to be mounted at the root portion of the blade 104. The root connector 140 comprises a hub connecting part 142, which is adapted to be attached to the central hub 106 of the rotor 102. The hub connecting part 142 may thus be sized and shaped so as to fit specific measures of the central hub 106. Hence, the root connector 140 may ensure that the blade 104 may be mounted to wind turbines 100 that are already in use. The blade 104 will at least not put specific requirements on the central hub 106.

The hub connecting part 142 may comprise a plate-like structure, which provides a circumferential shape that fits the central hub 106. The hub connecting part 142 may be attached to the central hub 106 e.g. by means of bolts or welding at the circumference of the plate-like structure. The plate-like structure may comprise a central hole in order to decrease the amount of material needed for manufacture of the root connector 140.

The root connector 140 may further comprise a blade connecting part 144. The blade connecting part 144 may be shaped as a connector 110, as described above. Hence, the connector 110 that is closest to the root portion of the blade 104 may be jointly formed by the blade connecting part 144 of the root connector 140 and by a connector 110 of a section 200 closest to the root portion of the blade 104. Alternatively, the sub-blades 108 and the diagonal strut members 112 closest to the root portion of the blade 104 may be attached directly to the blade connecting part 144. The cross-section of the sub-blade 108 may be circular rather than airfoil-shaped at the end for facilitating attachment to the blade connecting part 144.

The hub connecting part 142 may have a smaller size in a cross-section of the blade 104 than the blade connecting part 144. This implies that the sub-blades 108 may be farther separated from each other at the root portion of the blade 104 than otherwise allowed by the size of the central hub 106. The root connector 140 may thus comprise a structure joining the smaller hub connecting part 142 to the larger blade connecting part 144.

In one embodiment, the root connector 140 comprises a truss-like structure for joining the hub connecting part 142 to the blade connecting part 144. The root connector 140 may comprise longitudinal strut members 146 that extend having a constant angle around a longitudinal axis of the blade 104. The longitudinal strut members 146 extend radially outwards from the hub connecting part 142 to the blade connecting part 144 in order to suit the larger size of the blade connecting part 144. The root connector 140 may further comprise diagonal strut members 148 extending from the hub connecting part 142 at a connection point of a first longitudinal strut member 146 to the blade connecting part 144 at a connection point of a second longitudinal strut member 146.

The longitudinal strut members 146 and/or the diagonal strut members 148 may have an airfoil-shaped cross-section in order to contribute to a lift force of the blade 104 when subject to a blowing wind.

In one embodiment, the blade connecting part 144 of the root connector 140 is formed by the longitudinal strut members 146 and diagonal strut members 148. The longitudinal strut members 146 and the diagonal strut members 148 may thus be directly attached to the connector 110 of the blade 104 that is closest to the root portion of the blade 104.

The root connector 140 may be delivered to the site at which the wind turbine 100 is to be installed in an assembled state. However, the root connector 140 may alternatively be delivered as separate parts, which may be assembled at the site and attached to the other parts of the blade 104. An example of a design of the blade 104 will now be further described in order to indicate the weight of an actual implementation of the blade 104. The exemplary blade comprises 60 m long sub-blades being designed with NREL S831 airfoils, as defined by National Renewable Energy Laboratory, having a variable chord along the length. The chord variation is linear, being 2 m at the root connector and 0.75 m at the tip of the blade. The sub-blades have a constant shell thickness of 2 mm. The sub-blades have a 4 mm thick spar inside the shell. The sub-blade is formed by an E-Glass Epoxy Composite having a density of 1870 kg/m$^3$, Young's modulus of 38 GPa, Poisson ratio of 0.3 and tensile strength of 1.8 GPa.

The blade is designed using three sub-blades, having six connectors spaced along the longitudinal direction of the blade. The three sub-blades are separated by 3 chord lengths. The connectors are separated such that a ratio between the distance to the adjacent connector and a spacing between the sub-blades in the connector 110 is held constant and set to 3. The connectors are provided with a hole between the joining parts. The two connectors closer to the root portion of the blade are 3 cm thick and the other connectors are 2 cm thick. The connectors are hollow with a shell thickness of 3 mm. The connectors are also formed by an E-Glass Epoxy Composite as defined above.

The blade further comprises diagonal strut members arranged between each pair of connection points between sub-blades and connectors. The diagonal strut members are designed with a symmetric stream-lined shape NACA 0024, as defined by National Advisory Committee for Aeronautics. Each group of diagonal strut members between two adjacent connectors has the same chord length. The chord length is larger closer to the root portion of the blade. The chord length of a group of diagonal strut members is 5% of the chord length of the sub-blades at the previous section closer to the root portion of the blade. Hence, the chord length for the diagonal strut members will vary from approximately 0.10 m to 0.045 m. The diagonal strut members are formed by a carbon fiber having a density of 1490 kg/m$^3$, Young's modulus of 176 GPa, Poisson ratio of 0.3 and tensile strength of 2.05 GPa.

With the example above, the total weight of the blade becomes approximately 3720.8 kg. This may be compared to a 60 m long blade having unitary shape. For instance, the wind turbine blade LM 61.5 P2 produced by LM Wind Power Blades of Kolding, Denmark has a length of 61.5 m and weighs 19 100 kg. Hence, the weight of the blade according to the invention may be less than 20% of a conventional blade.

Further, the blade according to the above example may provide a lift-to-drag ratio, measured as a lift coefficient divided by a drag coefficient, of approximately 100. This implies that the aerodynamic properties of the blade do not differ substantially from a blade having unitary shape, which typically provides a lift-to-drag ratio of 100-150. Further, the efficiency of the blade is not highly dependent on the lift-to-drag ratio. Rather, a decrease of the lift-to-drag ratio from 150 to 100 may only decrease the overall efficiency of the blade by approximately 2%.

Figure 7:
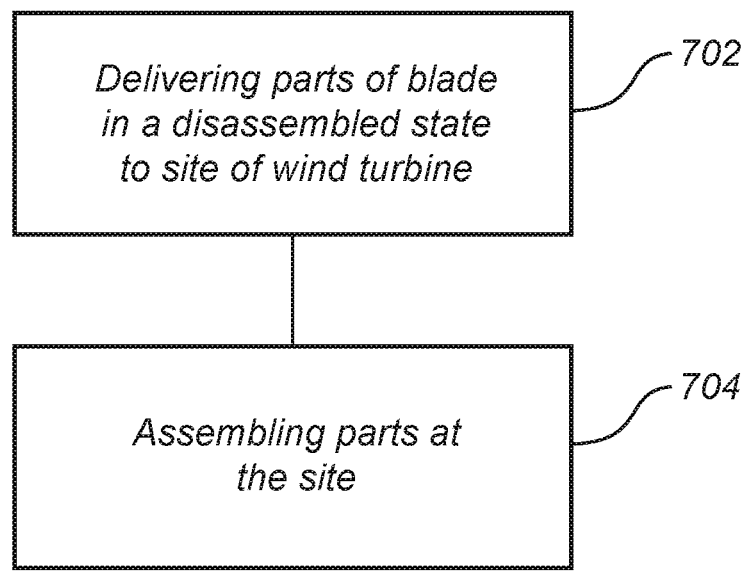
FIG. 7 is a flowchart of a method for assembly of a blade according to an embodiment of the invention.

Referring now to FIG. 7, a method for assembly of a blade 104 will be described. The method 700 comprises delivering, step 702, parts of the blade 104 in a disassembled state to the site at which the wind turbine 100 is to be installed. The method 700 further comprises assembling, step 704, the parts of the blade 104 at the site to a fully assembled blade 104. The blade 104 may be assembled to its fully assembled state by mounting the parts of the blade 104 to the central hub 106, which may or may not already be mounted to the tower of the wind turbine 100. Alternatively, the blade 104 may be attached to the central hub 106 once the blade 104 has been fully assembled.

The blade 104 may be differently partitioned as described above, and may hence be delivered in sections 200, which may be attached to each other at the site.

Alternatively, the blade 104 may be delivered as sub-blades 108 separated from the connectors 110. The assembling step 704 may thus comprise inserting each sub-blade 108 through a through-going hole 132 of each connector 110. The through-going holes 132 may then be fitted to the cross-sectional shape of the sub-blade 108 at the longitudinal position of the connector 110 in the blade 104. The through-going holes 132 may further be differently angled in the connectors 110 so as to control a twist of the airfoil-shaped cross-section of the sub-blade 108 along a longitudinal direction of the sub-blade 108.

The person skilled in the art realizes that the present invention by no means is limited to the preferred embodiments described above. On the contrary, many modifications and variations are possible within the scope of the appended claims.

For example, a blade having a truss-like structure may be used in a vertical axis wind turbine (VAWT). Then, an outer shape of the truss-like structure of the blade may mimic the shape of presently used VAWT blades. This implies that the blade may be used to replace blades in already existing VAWT plants.

Also, the blade need not necessarily be formed in its entirety by a truss-like structure. For instance, tip portions of the sub-blades may extend beyond the connector which is farthest away from the hub. Alternatively or additionally, the root connector may be formed as a unitary body. The root connector is exerted to large gravity loads and it may therefore be advantageous to provide the root connector as a unitary body. Further, providing the root connector as a unitary body may facilitate attaching the blade to the hub of the wind turbine.

The invention claimed is:

1. A blade for a rotor of a wind turbine, said blade comprising:
a truss-like three-dimensional structure having strut members forming the truss-like structure, wherein a plurality of the strut members in the truss-like structure have an airfoil-shaped cross-section,
wherein the truss-like structure comprises a plurality of longitudinal strut members extending substantially along a longitudinal direction of the blade, wherein the plurality of longitudinal strut members have an airfoil-shaped cross-section, and
wherein the plurality of longitudinal strut members are separated along an entire longitudinal direction of the blade, and
wherein the truss-like structure further comprises at least two connectors, wherein the at least two connectors are arranged to extend in a cross-sectional direction of the blade, and
wherein the at least two connectors are arranged to control a positioning of the plurality of longitudinal strut members in relation to each other, and
wherein the at least two connectors are plate-like structures with through-going holes that fit the shape of the longitudinal strut members, wherein the through-going holes are angled differently in the at least two plate-like structures in order to vary the orientation of the airfoil-shaped cross-section of the plurality of longitudinal strut members along the longitudinal direction of the blade.

2. The blade according to claim 1, wherein the truss-like structure further comprises a plurality of diagonal strut members, wherein a diagonal strut member extends from a connection point between a first longitudinal strut member and a first connector to a connection point between a second longitudinal strut member and a second connector.

3. The blade according to claim 1, wherein the through-going holes are arranged on the at least two connectors to provide the relative position of the longitudinal strut members to each other, and wherein a twist of the longitudinal strut members is forced by the arrangement of the through-going holes in the at least two connectors.

4. The blade according to claim 1, wherein the through-going holes are angled in the plate-like structures so as to control a twist of the plurality of longitudinal strut members along the longitudinal direction of the blade.

5. The blade according to claim 1, wherein proportions of the airfoil-shaped cross-section of the plurality of longitudinal strut members are constant over substantially the entire length of the plurality of longitudinal strut members.

6. A wind turbine, comprising at least one blade according to claim 1.

7. The blade according to claim 1, wherein the at least two connectors vary in size along the longitudinal direction of the blade.

* * * * *